March 17, 1942.  H. F. BROWN  2,276,462
BORING CHUCK
Filed May 16, 1939
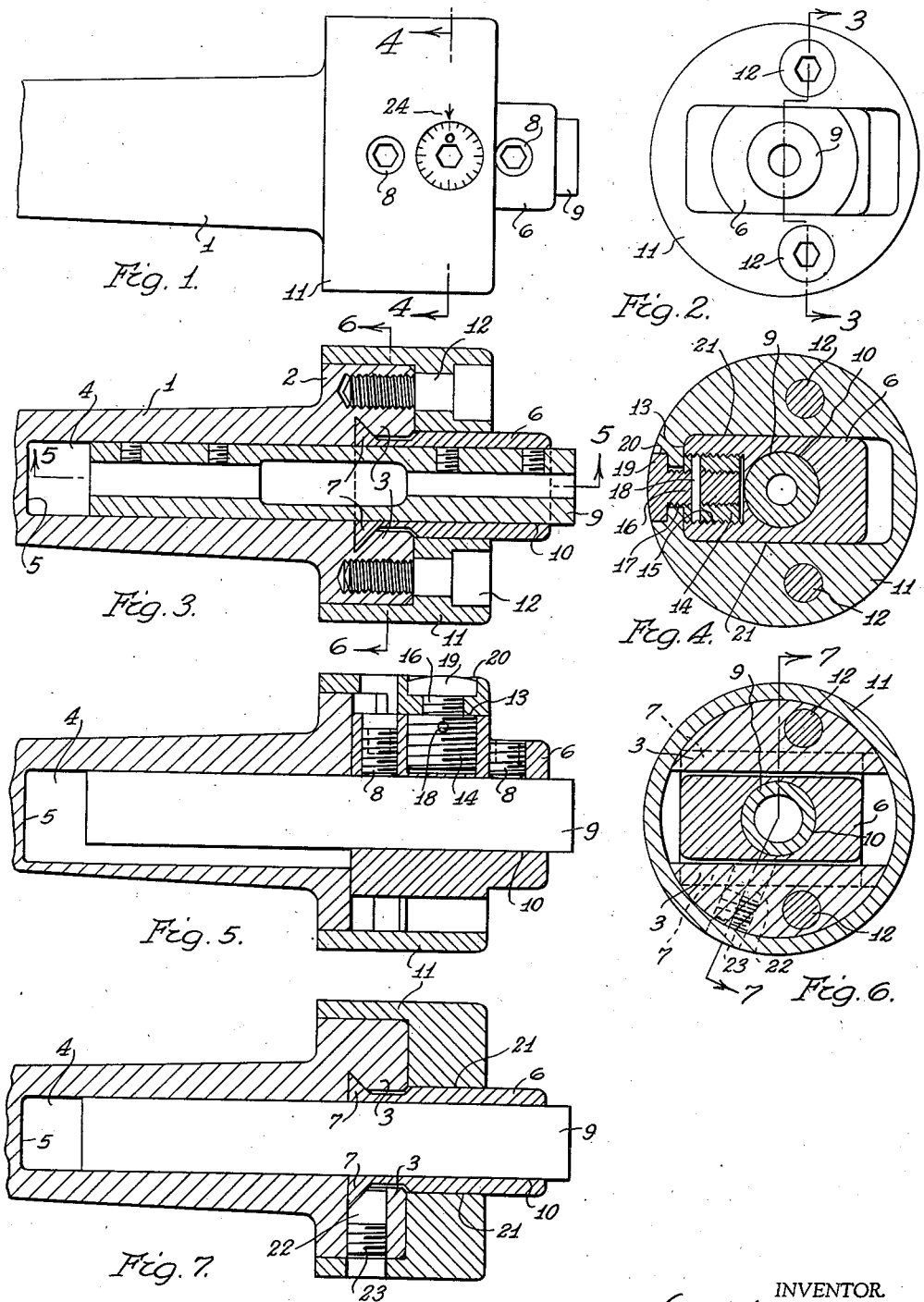
INVENTOR.
Harry F. Brown
BY
*(signature)*
ATTORNEY.

Patented Mar. 17, 1942

2,276,462

UNITED STATES PATENT OFFICE 2,276,462

BORING CHUCK

Harry F. Brown, Detroit, Mich.

Application May 16, 1939, Serial No. 273,966

2 Claims. (Cl. 279—6)

This invention relates to tool chucks and has for its primary object to provide a chuck having means supporting a cutting tool for eccentric adjustment movement, the chuck being adapted for use with any of the various types of cutting tools which perform the working or cutting operation as a result of relative rotation between the tool and the work member.

Another object is to provide a chuck composed of a shank and means mounting a tool holder thereon for eccentric adjustment movement, said means being so constructed and arranged that a high degree of accuracy and precision may be obtained. In this respect the shank and the tool holder have coacting dovetail slide and guide members enclosed in a reinforcing element which, in addition to acting as an enclosing housing, coacts with the slide and guide members to prevent such deflections as would result in lack of accuracy and precision.

Another object is to provide a chuck of this type with an indicator for indicating the position of the tool holder with respect to the center of rotation of the chuck and a positive stop arranged to stop movement of the holder in a central position to confine adjustment movement to one side of the center. The tool holder may, in other words, move from a dead center position outwardly, but cannot cross the center. With this arrangement the indicator cannot be moved beyond its zero position, and the operator may move the tool holder to its central position without observing the indicator.

Another object is to provide means for adjustably moving the tool holder which is free from lost movement between the tool holder and the indicator, to provide for accurate indications by the indicator.

In placing a tool chuck in the spindle of a machine the tapered chuck shank is usually driven into tight engagement with the spindle by a blow from a hammer or mallet. With adjustably moving parts it is not practical to strike the head of the chuck, and it is another object of this invention to construct the chuck so that it may be driven within a spindle without subjecting the head thereof to a blow. In this respect the head portion having the parts which move relatively to provide for eccentric adjustment of the tool have an opening therethrough which coincides with an opening in the shank. A rod or the like is inserted into and engages the bottom of the shank opening, and when this rod is struck the force of the blow is applied directly on the shank. My prior application Serial No. 149,863 filed June 23, 1937, now Patent 2,177,820 of October 31, 1939, shows but does not claim a similar arrangement.

Other objects and advantages will become more fully apparent as reference is had to the accompanying drawing wherein my invention is illustrated, and in which:

Fig. 1 is a side elevation of the chuck,

Fig. 2 is an end elevation,

Fig. 3 is a section taken on the line 3—3 of Fig. 2,

Fig. 4 is a section taken on the line 4—4 of Fig. 1,

Figs. 5 and 6 are sections taken respectively on lines 5—5 and 6—6 of Fig. 3, and Fig. 7 is a section taken on the line 7—7 of Fig. 6.

More particularly, I designates a tapered shank having an enlarged cylindrical head on the larger end thereof formed with diametrically extending dovetail guide members 3 in the outer face thereof. The shank I has a well 4 therein opening through the head 2 between the guide members 3 and terminating at the end wall 5.

A tool holder 6 has a dovetail slide member 7 slidably received between the guide members 3 and set screws 8 for clamping a tool collet 9 in the opening 10 therein. The collet 9 is comparatively long in order to provide opposite end portions of different proportions for receiving and supporting tools of different diametric sizes. The well 4 accommodates the inwardly projecting end of the collet.

A housing 11 has a portion encircling the head 2 and secured thereon by bolts 12. The housing preferably has a light press fit with the head and acts to reinforce the guide members 3 from deflections which otherwise might occur in the presence of expanding forces. The housing 11 protects the relatively slidable members 3 and 7 from dirt etc., and has a wall 13 which acts as an abutment for limiting sliding movement of the tool holder. The abutment wall 13 is so positioned that the collet receiving opening 10 is coaxial with the shank I when the tool holder is in contact therewith.

A sleeve 14 has external threads received in the screwthreaded bore 15 in the tool holder 6, and internal threads receiving the end of a bolt 16 which extends freely through a bore 17 in the housing 11. The bolt 16 is secured against rotation with respect to the sleeve 14 by a pin 18, and has a head 19 received in a recess 20 in the housing 11. The head 19 and the sleeve 14 hold the bolt 16 against lengthwise movement and, therefore, by rotating the bolt 16 the work holder may be shifted with respect to the guides. The head 19 has indicia thereon as shown in Fig. 1, so arranged that zero is opposite the reference arrow 24 when the tool holder is in contact with the abutment wall 13.

When a tool is placed in the collect 9 and the chuck is placed in use forces are set up which tend to expand the guide members. This is prevented by the encircling housing 11. There are also forces which tend to deflect the tool holder by axial bending, and such deflection is prevented by the provision of bearing surfaces 21 which are also formed in the housing 11. The tool holder is thus provided with bearing surfaces at each end thereof.

After adjustment of the tool holder has been made it is frictionally held against accidental movement by a soft metal gib 22 which is pressed into contact with one of the angular surfaces on the slide member 7 by a set screw 23. The gib 22 has wedging engagement with the surface of the tool holder with which it contacts and therefore induces sufficient friction to provide for securement of the tool holder.

When assembling the chuck in the spindle of a machine the collet is removed and a rod or similar element is inserted in the well 4 and placed in contact with the wall 5. The rod may be struck by a hammer or mallet, and the force of the blow is applied directly against the shank, rather than against the head portion of the chuck.

What is claimed is:

1. In a chuck, a tool holder having dovetail slides, a head having diametric dovetail guides receiving said slides and supporting the tool holder projecting endwise from the head, an element secured to said head and having supporting surfaces endwise remote from the guide surfaces and coacting therewith in supporting the tool holder, an angularly shaped soft-metal gib supported for engagement with one of said slides, and releasable means for holding said gib in wedging engagement, said element reinforcing said head in the region of said gib to prevent distortion of the head when said gib is tightened into wedging engagement.

2. In a chuck, a tapered shank having an integral enlarged cylindrical head with diametric dovetail guide members on the outer face thereof, a tool holder having a lengthwise extending opening adapted to receive a tool, said tool holder having diametric dovetail slide members on the inner end thereof and slidably disposed in said guide members, said tool holder having external guide surfaces extending parallel to the dovetail guide and slide members, a transverse wall bolted to said head and having an opening through which said tool holder extends, said opening having parallel side walls constituting guide surfaces for coaction with the external guide surfaces on said tool holder, a cylindrical housing member integral with said transverse wall and encircling said head, and means for causing sliding movement of said tool holder.

HARRY F. BROWN.